(12) United States Patent
Zeng et al.

(10) Patent No.: US 10,364,194 B2
(45) Date of Patent: Jul. 30, 2019

(54) COMPOSITE MATERIAL AND METHOD FOR PREPARING THE SAME

(71) Applicant: CENTRAL SOUTH UNIVERSITY, Changsha (CN)

(72) Inventors: Yi Zeng, Changsha (CN); Xiang Xiong, Changsha (CN); Dini Wang, Changsha (CN); Wei Sun, Changsha (CN); Zhaoke Chen, Changsha (CN); Yalei Wang, Changsha (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 0 days.

(21) Appl. No.: 15/985,736

(22) Filed: May 22, 2018

(65) Prior Publication Data

US 2018/0334410 A1    Nov. 22, 2018

(30) Foreign Application Priority Data

May 22, 2017  (CN) .......................... 2017 1 0361716

(51) Int. Cl.
   *C04B 35/83*     (2006.01)
   *C04B 41/87*     (2006.01)
   (Continued)

(52) U.S. Cl.
   CPC ............ *C04B 35/83* (2013.01); *C04B 41/009* (2013.01); *C04B 41/4529* (2013.01); *C04B 41/5057* (2013.01); *C04B 41/87* (2013.01); *C04B 2235/3821* (2013.01); *C04B 2235/3826* (2013.01); *C04B 2235/3843* (2013.01); *C04B 2235/614* (2013.01)

(58) Field of Classification Search
   CPC ... C04B 35/83; C04B 41/009; C04B 41/5057; C04B 41/87; C04B 41/4529; C04B 2235/3821; C04B 2235/3843; C04B 2235/3826; C04B 2235/614
   See application file for complete search history.

(56) References Cited

U.S. PATENT DOCUMENTS 5,015,540 A * 5/1991 Borom .................. C04B 35/573
                                                         264/332
6,979,490 B2 * 12/2005 Steffier .................... B32B 18/00
                                                         428/292.1

(Continued)

*Primary Examiner* — Noah S Wiese
(74) *Attorney, Agent, or Firm* — Matthias Scholl P.C.; Matthias Scholl (57) ABSTRACT

A method for preparing a ceramic-modified carbon-carbon composite material. The method includes preparing and thermally treating a carbon fiber preform, and depositing pyrolytic carbon on the carbon fiber preform in a chemical vapor infiltration furnace, to yield a porous carbon-carbon composite material; placing the carbon-carbon composite material deposited with the pyrolytic carbon on a zirconium-titanium powder mixture, and performing a reactive melt infiltration, to yield a carbon-carbon composite material modified by non-stoichiometric zirconium titanium carbide; and placing the carbon-carbon composite material modified by non-stoichiometric zirconium titanium carbide in a powder mixture including carbon, boron carbide, silicon carbide, silicon, and an infiltration enhancer, and performing an embedding method, to form a ceramic-modified carbon-carbon composite material.

9 Claims, 8 Drawing Sheets

(51) Int. Cl.
*C04B 41/45* (2006.01)
*C04B 41/00* (2006.01)
*C04B 41/50* (2006.01)

(56) References Cited

U.S. PATENT DOCUMENTS 8,980,027 B2 * 3/2015 Pailler .................... B82Y 30/00
                                                                                           156/89.11
2017/0044069 A1 * 2/2017 Harris ..................... C04B 35/64

* cited by examiner

COMPOSITE MATERIAL AND METHOD FOR PREPARING THE SAME

CROSS-REFERENCE TO RELAYED APPLICATIONS

Pursuant to 35 U.S.C. § 119 and the Paris Convention Treaty, this application claims foreign priority to Chinese Patent Application No. 201710361716.8 filed May 22, 2017, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND

The disclosure relates to a composite material and a method for preparing the same.

Carbon-carbon composite materials are known but they are prone to oxidation.

SUMMARY

Disclosed is a method for preparing a ceramic-modified carbon-carbon composite material and a preparation method thereof. The resulting carbon-carbon composite material exhibits good oxidation resistance and good thermal shock resistance.

Disclosed is a method for preparing a ceramic-modified carbon-carbon composite material, the method comprising:

1) preparing and thermally treating a carbon fiber preform, and depositing pyrolytic carbon on the carbon fiber preform in a chemical vapor infiltration furnace, to yield a porous carbon-carbon composite material;
2) placing the carbon-carbon composite material deposited with the pyrolytic carbon on a zirconium-titanium powder mixture, and performing a reactive melt infiltration, to yield a carbon-carbon composite material modified by non-stoichiometric zirconium titanium carbide; and
(3) placing the carbon-carbon composite material modified by non-stoichiometric zirconium titanium carbide in a powder mixture comprising C, $B_4C$, SiC, Si, and an infiltration enhancer, and performing an embedding method, to form a ceramic-modified carbon-carbon composite material.

The prepared carbon-carbon composite material can comprise, in percentages by volume, 20-80% of a carbon matrix material, 15-78% of a $Zr_{0.8}Ti_{0.2}C_{0.74}B_{0.26}$ ceramic material, and 2-5% of a SiC ceramic material; the carbon matrix material is the carbon-carbon composite material deposited with the pyrolytic carbon.

The carbon-carbon composite material prepared in the disclosure is modified by a $Zr_{0.8}Ti_{0.2}C_{0.74}B_{0.26}$ ceramic layer. The $Zr_{0.8}Ti_{0.2}C_{0.74}B_{0.26}$ ceramic layer is the outmost layer of the composite material and is ablation resistant, contains less carbon matrix. The content of the carbon matrix increases from the outside to the inside of the composite material. The shallow surface layer under the outmost layer is a composite layer of $Zr_{0.8}Ti_{0.2}C_{0.74}B_{0.26}$ ceramic and SiC ceramic. The element boron (B) is introduced to the non-stoichiometric zirconium titanium carbide and the SiC ceramic is introduced to the shallow surface layer through the embedding method to form a $Zr_{0.8}Ti_{0.2}C_{0.74}B_{0.26}$/SiC composite ceramic layer.

The carbon fiber preform may have a density of 0.1-0.9 $g \cdot cm^{-3}$, and can comprise a needled felt or a three-dimensional braided body; in 1), the thermal treatment of the carbon fiber preform can comprise placing the carbon fiber preform in a graphite furnace, and incubating at a temperature of between 2000 and 2300° C. for between 1 and 3 hrs. The heating rate can be 5-10° C./min, and the cooling rate can be 5-8° C./min. When the temperature drops to 1200° C., the carbon fiber preform can be cooled naturally.

In 1), depositing pyrolytic carbon on the carbon fiber preform in a chemical vapor infiltration furnace can comprise charging nitrogen, hydrogen, and propylene or methane to the chemical vapor infiltration furnace, and controlling a furnace temperature of between 1000 and 1300° C., a furnace pressure of between 0.3 and 1.3 kPa and a reaction time of between 10 and 60 hrs; and the prepared porous carbon-carbon composite material can have a porosity of between 20 and 40%.

The zirconium-titanium powder mixture can be prepared by: sieving a zirconium power having a purity of ≥99.9% using a 325-mesh screen, sieving a titanium powder having a purity of ≥99.9% using a 325-mesh screen, mixing the zirconium power and the titanium powder in a molecular ratio of 0.8:0.2, ball milling the power mixture using a planetary ball mill, and drying a ball-milled mixed powder for 3-8 hrs under vacuum at 80-90° C.; a ball-milling speed can be 200-300 rpm, a ball-milling time can be 10-25 hrs, a ball-to-powder ratio can be 4-10, and a ball-milling medium can be alcohol.

In 2), the reactive melt infiltration can be implemented as follows: weighing the zirconium-titanium powder mixture in an amount that is 3-5 times the weight of the porous carbon-carbon composite material, compacting the zirconium-titanium powder mixture in a graphite can, placing the porous carbon-carbon composite material on the zirconium-titanium powder mixture, and placing the graphite can in an infiltration furnace which is heated to a temperature of between 1900 and 2300° C. in a heating rate of 10-20° C./min for between 0.5 and 2 hours in the presence of argon.

The embedding is to introduce the element B and SiC respectively to the non-stoichiometric zirconium titanium carbide and the shallow surface layer of the carbon-carbon composite material. In 3), the infiltration enhancer is $Al_2O_3$, $B_2O_3$, $SiO_2$, or a mixture thereof; and the embedding method is implemented at a temperature of between 1600 and 1800° C. for between 0.5 and 2 hrs in the presence of argon.

The embedding method can be implemented as follows:

a) weighing and mixing, on the basis of a total weight of a resulting mixture, 30%-70% by weight (wt. %) of silicon, 5-10 wt. % of alumina ($Al_2O_3$), 10-20 wt. % of carbon, and 10-40 wt. % of silicon carbide (SiC), to yield a mixture; uniformly mixing the mixture with alcohol in a planetary ball mill, and drying, to yield a first powder mixture A;

b) weighing, on the basis of a total weight of a resulting mixture, 30-80 wt. % of boron carbide ($B_4C$) and 20-70 wt. % of boron oxide ($B_2O_3$), and uniformly mixing in a planetary ball mill, and drying, to yield a second powder mixture B;

c) weighing and mixing 20-50 wt. % of the first powder mixture A and 50-80 wt. % of the second powder mixture B, to yield a first power for modifying the carbon-carbon composite material modified by non-stoichiometric zirconium titanium carbide;

d) weighing and mixing 50-80 wt. % of the first powder mixture A and 20-50 wt. % of the second powder mixture B, to yield a second powder for modifying carbon-carbon composite material modified by non-stoichiometric zirconium titanium carbide;

e) weighing the first power and the second powder in a weight ratio of 0.2-1:1, a weight ratio of the carbon-carbon composite material modified by non-stoichiometric zirconium titanium carbide to a mixture of the first power and the second powder being 0.05-0.2:1; and f) respectively embedding the first power and the second powder on the carbon-carbon composite material modified by non-stoichiometric zirconium titanium carbide at a temperature of between 1600 and 1800° C. for between 0.5 and 2 hrs in the presence of argon.

The disclosure also provides a ceramic-modified carbon-carbon composite material, comprising, in percentages by volume, 20-80% of a carbon matrix material, 15-78% of a $Zr_{0.8}Ti_{0.2}C_{0.74}B_{0.26}$ ceramic material, and 2-5% of a silicon carbide ceramic material.

The method of the disclosure can be applicable to the modification of a matrix and a coating of a porous carbon-carbon composite material prepared by chemical vapor infiltration and/or liquid phase impregnation, to improve the anti-ablation performance of the composite material.

The modification of the matrix and the coating described in the disclosure means that an anti-ablation $Zr_{0.8}Ti_{0.2}C_{0.74}B_{0.26}$ ceramic coating is formed on the outermost layer of the finally prepared material. The ceramic coating contains less carbon matrix. The content of the carbon matrix increases from the outside to the inside of the composite material. The ceramics in the ceramic coating and in the modified material matrix are in a gradient and continuous distribution, and there is no obvious physical interface separating the coating from the matrix, so that the thermal matching performance between the coating and the material matrix is improved, resulting in improved thermal shock resistance and anti-ablation performance of the composite material on a whole and thus providing a better protection for the carbon matrix.

The multi-component borocarbide ($Zr_{0.8}Ti_{0.2}C_{0.74}B_{0.26}$) prepared in the disclosure is an ultrahigh temperature ceramic. Unlike other multi-phase ultrahigh temperature ceramics, the ceramic phase has a stable face-centered cubic (FCC) crystal structure of a carbide. The titanium atoms occupy some of the positions of the zirconium atoms by means of replacement, and the B atoms are filled in the vacant sites of the carbon atoms in the non-stoichiometric carbide. The above structure makes the material have both the high melting point and the oxidation resistance, and have a boron content (13 at. %) that is reduced relative to $ZrB_2$ (66 at. %). With the ceramic of such a structure, the problem that the two advantages of the high temperature resistance of the carbide and oxidation resistance of the boride cannot coexist is well solved, and the problem of large volatilization of materials caused by the high boron content in the boride is also solved. It is important to introduce a composite gradient of the above-mentioned ultrahigh temperature ceramic and the SiC ceramic with good oxidation resistance into the carbon-carbon composite material, to yield a carbon-carbon composite material having a modified structure of the matrix and the coating. The modified carbon-carbon composite material has a relatively dense anti-ablation ceramic outer layer, and the ceramics in the ceramic outer layer and in the modified material matrix are in a gradient and continuous distribution, and there is no obvious physical interface separating the coating from the matrix, so that the thermal matching performance between the coating and the material matrix is improved, resulting in improved thermal shock resistance and anti-ablation performance of the composite material on a whole and thus providing a better protection for the carbon matrix.

Advantages of the method for preparing a ceramic-modified carbon-carbon composite material of the disclosure are summarized as below:

(1) The ceramic has a face-centered cubic (FCC) crystal structure and exhibits high-melting-point characteristics and better oxidation resistance.

(2) The pyrolytic carbon layer on the matrix of the carbon-carbon composite material can well relieve the thermal stress between the carbon fiber and the ceramic phase, well prevent the liquid titanium-zirconium alloy from eroding the carbon fiber, and also provide a carbon source for the titanium-zirconium alloy phase to form a zirconium titanium carbide. The ceramic phase and the carbon material are distributed in a gradient, improving the thermal shock resistance of the material.

(3) The ceramic outer layer of the modified material has a high melting point, and the oxide film formed in an ablation process can provide better protection for the carbon matrix. The introduction of SiC and the element B reduces the oxygen diffusion coefficient of the oxide layer, and improves the thermal shock resistance.

Figure 1:
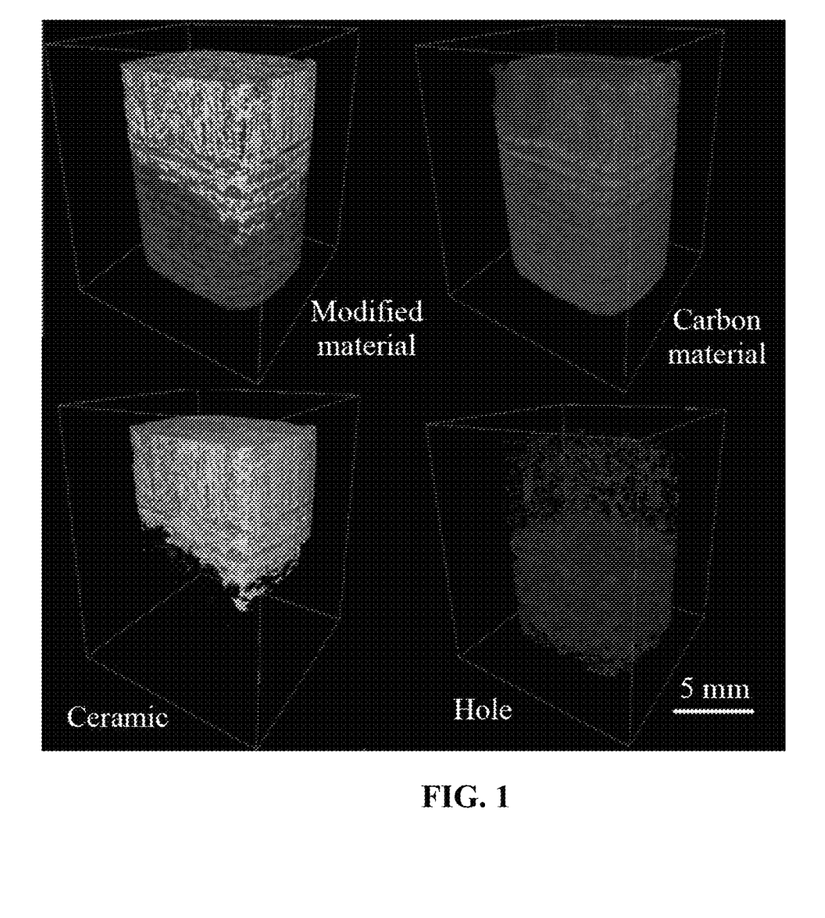
FIG. 1 shows an image of three-dimensional X-ray tomography of a ceramic-modified carbon-carbon composite material in the disclosure.

As can be seen from FIG. 1, the $Zr_{0.8}Ti_{0.2}C_{0.74}B_{0.26}$ ceramic outer layer is dense and less porous, and contains less carbon material; the content of the carbon matrix increases from the outside to the inside of the composite material, and the content of the ceramic material decreases gradually, so a morphology in which the ceramic and the carbon matrix material are in gradient distributions is displayed. This facilitates the reduction of the stress between the ceramic outer layer and the carbon matrix material, thereby improving the thermal shock resistance of the material.

Figure 2:
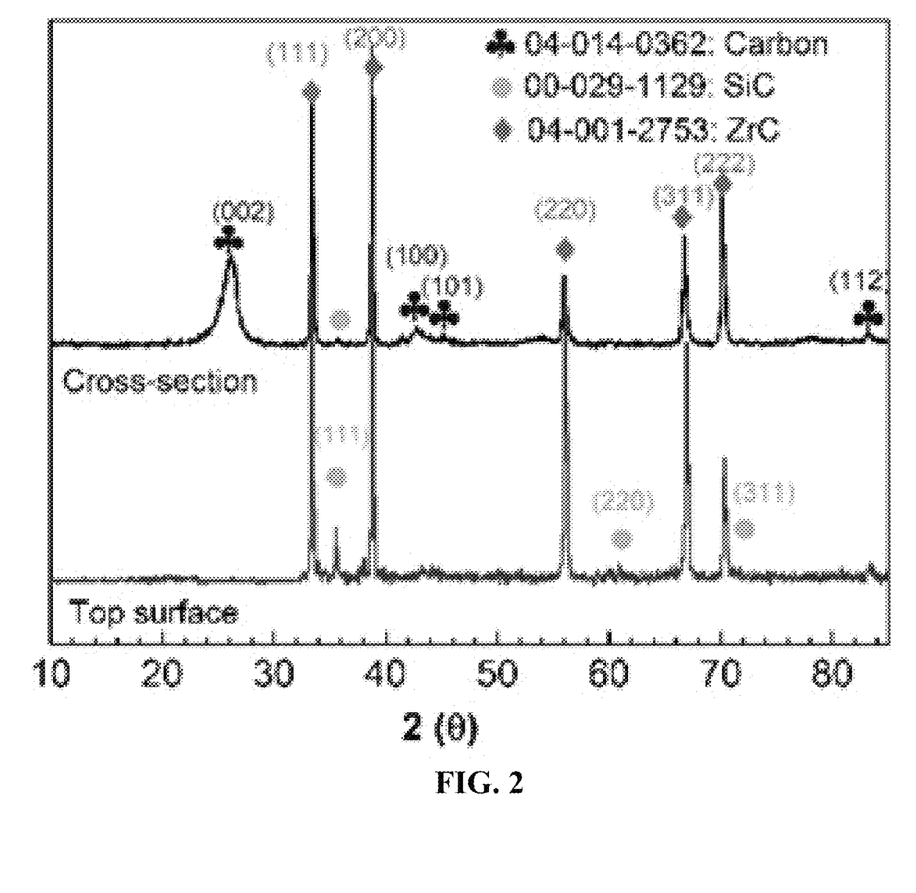
FIG. 2 shows an XRD pattern of a surface and a cross section of a ceramic-modified carbon-carbon composite material in the disclosure.

As can be seen from FIG. 2, the scanning results of the cross section and the ceramic surface of the composite material show that the $Zr_{0.8}Ti_{0.2}C_{0.74}B_{0.26}$ ceramic exhibits typical ZrC XRD diffraction peaks.

Figure 3A:
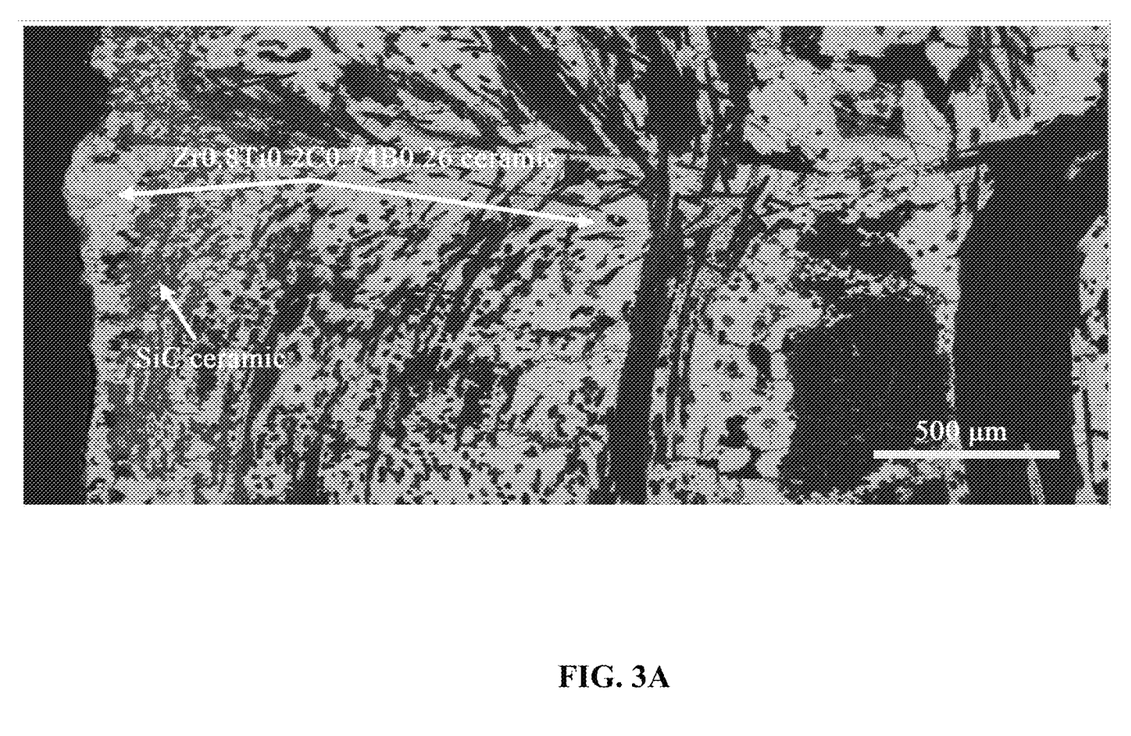
FIG. 3A shows a cross-sectional view of a ceramic-modified carbon-carbon composite material in the disclosure.
Figure 3B:
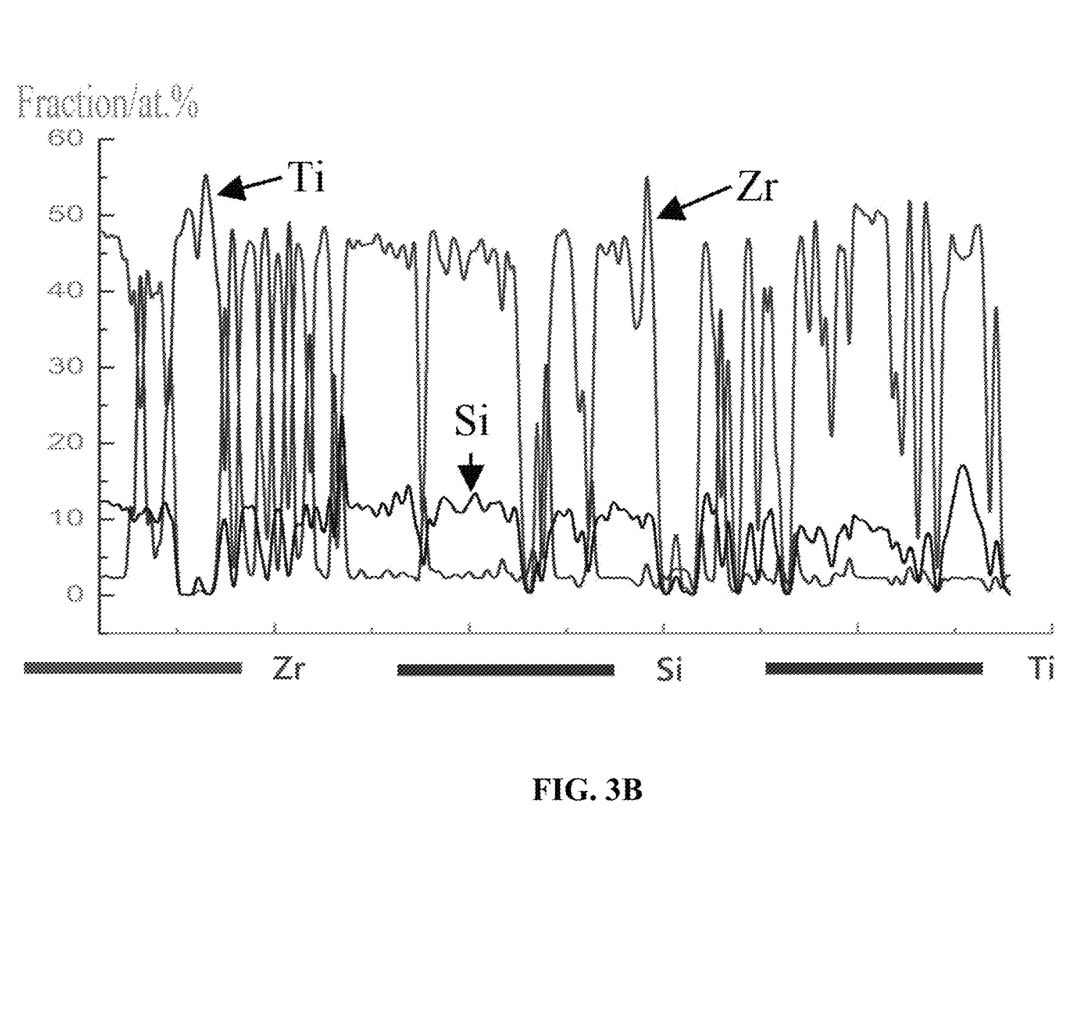
FIG. 3B shows an elemental scanning pattern of Zirconium, Titanium, and Silicon of a ceramic-modified carbon-carbon composite material in the disclosure.
Figure 3C:
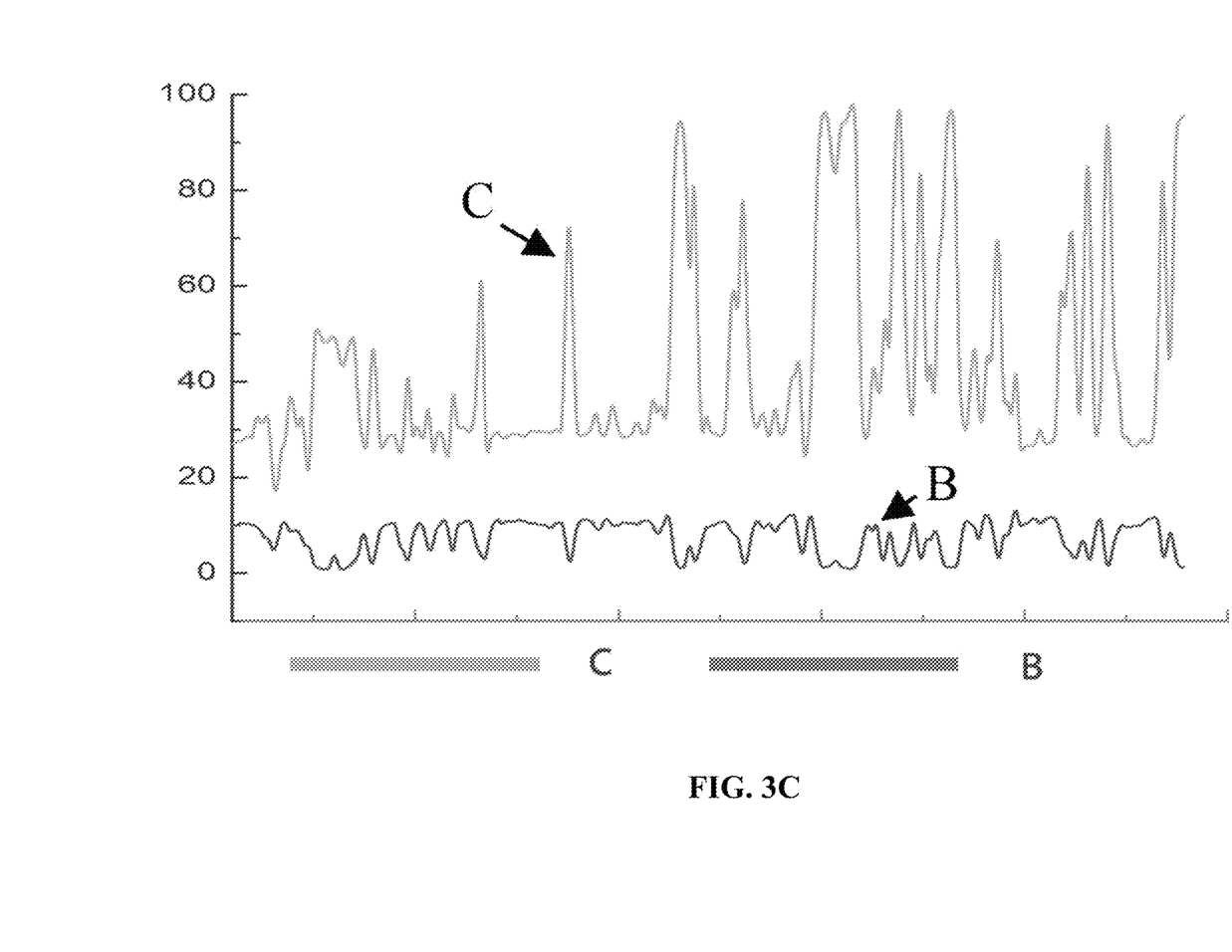
FIG. 3C shows an elemental scanning pattern of Carbon and Boron of a ceramic-modified carbon-carbon composite material in the disclosure.

As can be seen from FIGS. 3A-3B, the $Zr_{0.8}Ti_{0.2}C_{0.74}B_{0.26}$ ceramic is in gradient distribution in the carbon matrix, and the SiC ceramic is present in the shallow surface layer. The elemental scan results show that the atomic ratio of Zr to Ti was 0.8:0.2, the proportion of element B is 13%, and the ratio of the element B to and C is 0.26:0.74.

Figure 4:
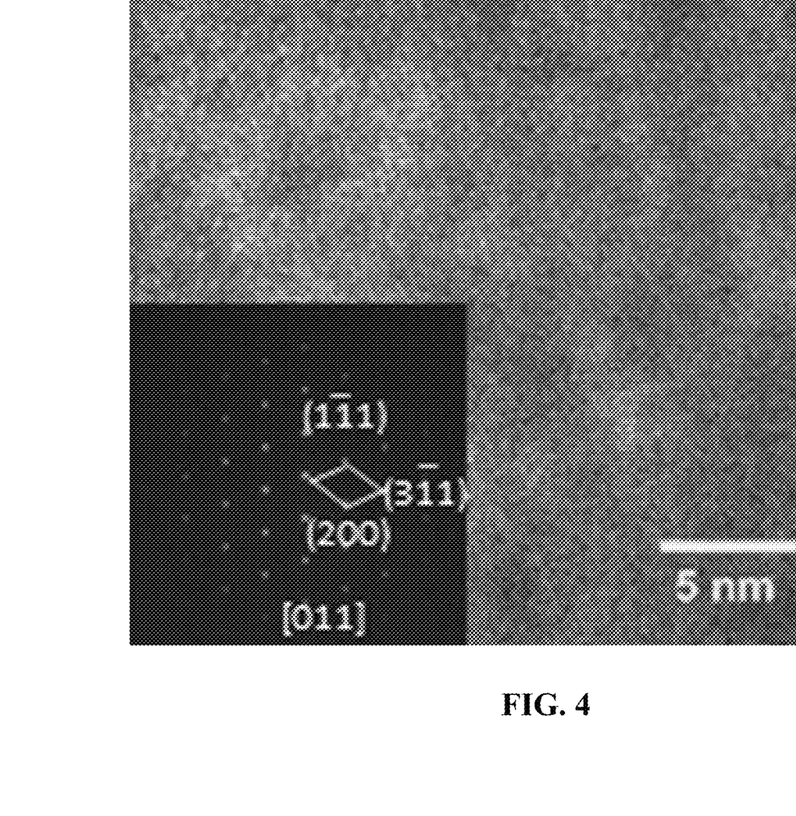
FIG. 4 shows a TEM image and diffraction spots of $Zr_{0.8}Ti_{0.2}C_{0.74}B_{0.26}$ ceramic.

As can be seen from FIG. 4, the high-resolution TEM image and diffraction spots of $Zr_{0.8}Ti_{0.2}C_{0.74}B_{0.26}$ ceramic show that the ceramic material has a face-centered cubic (FCC) crystal structure. Therefore, it can be determined from the XRD diffraction peaks in FIG. 2 and the diffraction spots in FIG. 4 that the material has a stable FCC single-phase structure of a carbide.

Figure 5:
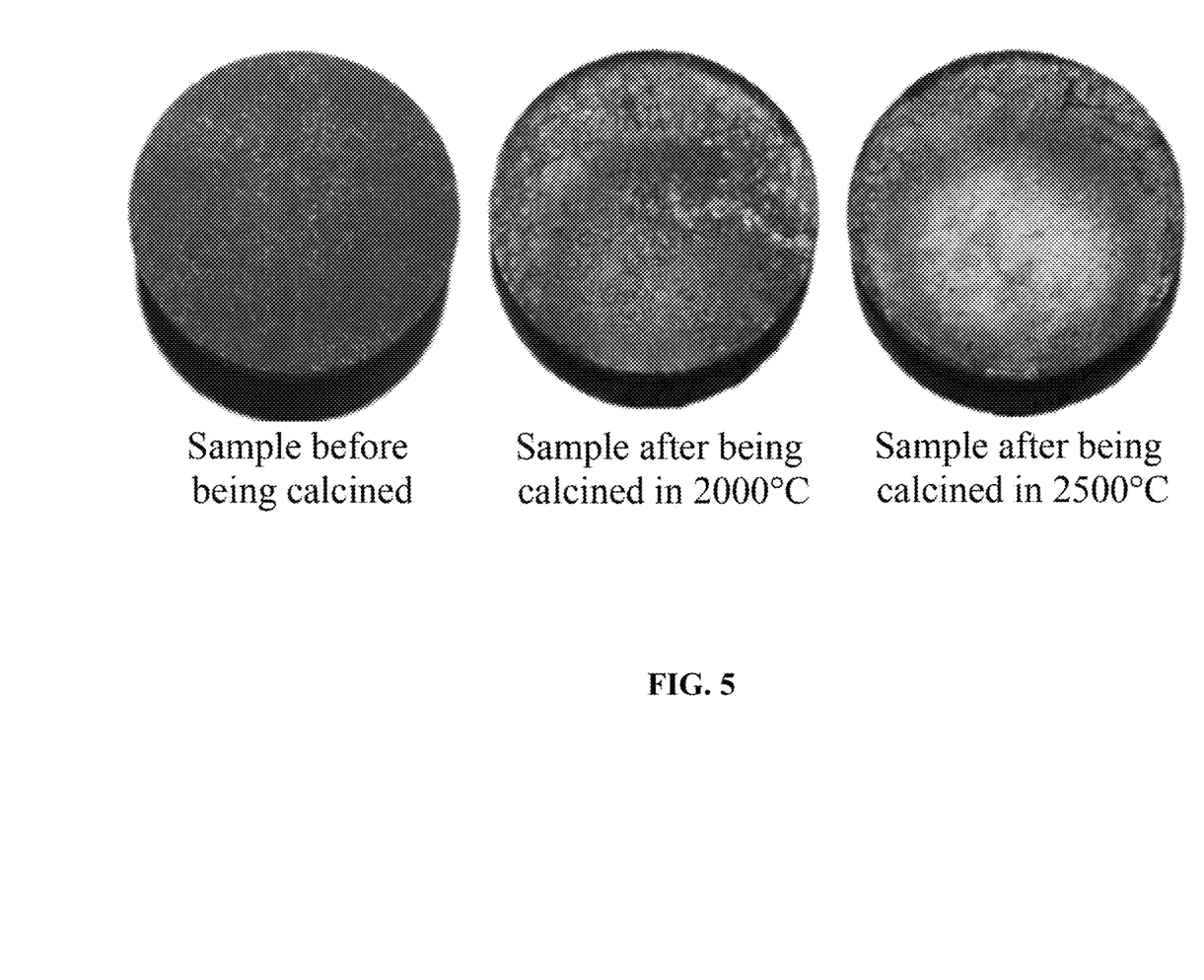
FIG. 5 is a photograph showing a macro-ablated morphology of a ceramic-modified carbon-carbon composite material in the disclosure in the disclosure.

As can be seen from FIG. 5, the surface of the ablated composite material is intact, and has no obvious bits resulting from ablation, thus exhibiting excellent anti-ablation performance.

Figure 6:
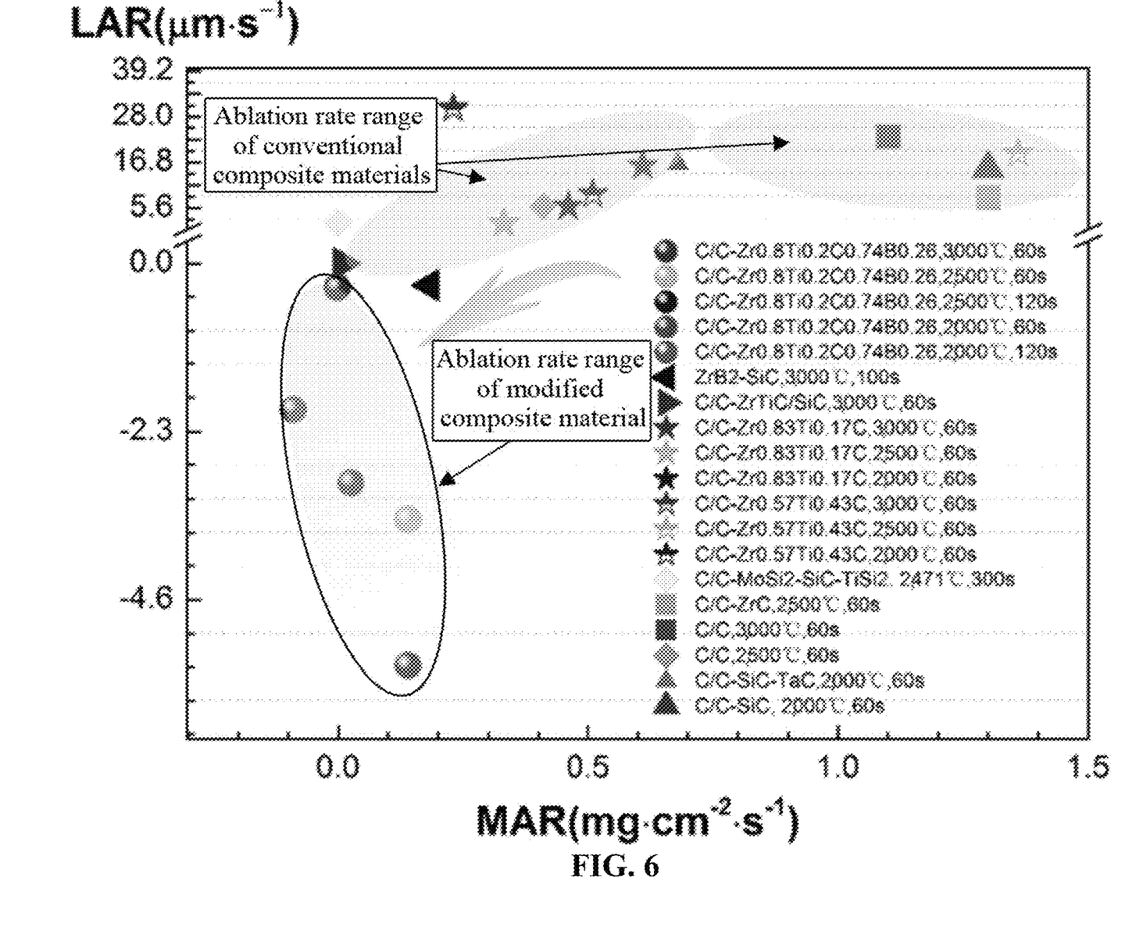
FIG. 6 is a graph comparing the linear ablation rate and the mass rate of a ceramic-modified carbon-carbon composite material in the disclosure in the disclosure.

As can be seen from FIG. 6, the ceramic-modified carbon-carbon composite material has a negative linear ablation rate at 2000-3000° C. (as shown by the ablation rate of the novel modified composite material indicated by the arrow in the figure). It means that the oxide formed by ablation and oxidation is expanded, and because of its strong adhesion, the expansion rate exceeds the flushing-off rate by the high-temperature airflow and the evaporation rate. Compared with the high rates of ablation loss of other common ultrahigh temperature ceramics and composite materials thereof (as shown by the ablation rates of the remaining composite materials indicated by the arrows in the figure), the ceramic-modified carbon-carbon composite material has better anti-ablation performance.

DETAILED DESCRIPTION

To further illustrate, experiments detailing a ceramic-modified carbon-carbon composite material and a preparation method thereof are described below. It should be noted that the following examples are intended to describe and not to limit the description.

Example 1

A zirconium power and a titanium powder having a purity of greater than 99.9% were mixed at an atomic ratio of 80:20, and then ball milled on a high-energy planetary ball mill, where the ball-milling speed was 400 rpm, the ball-milling time was 10 hrs, the ball-to-material ratio was 5, and the ball-milling medium was anhydrous alcohol. The ball-milled powder was dried for 8 hrs in a vacuum oven at 80° C., for later use in subsequent steps.

A needled felt of carbon fiber having a density of 0.42 $g/cm^{-3}$ was subjected to high temperature treatment to remove the organic adhesive on the fiber surface and release the stress, where the treatment temperature was 2200° C., and the incubation time was 1 hr.

After the heat treatment, the felt body was placed in a chemical vapor deposition furnace, on which pyrolytic carbon was deposited, to increase the density of the carbon fiber felt body. In this way, a porous carbon-carbon composite material is prepared. The density-increased porous carbon-carbon composite material has a density of 1.2 $g/cm^3$, and a porosity of 31.2%.

The above-mentioned powder mixture was placed in a graphite can and compacted, and the cut, cleaned and dried carbon-carbon composite material was placed on the compacted powder mixture. The graphite can be then positioned in a high-temperature furnace for heat treatment at 1900° C., where the incubation time was 1 hr and the whole process was carried out under argon protection.

Then a powder A comprising 70% by weight (wt. %) of a Si powder, 10 wt. % of $Al_2O_3$ powder, 10 wt. % of a C powder, and 10 wt. % of a SiC powder was prepared as follows. The above proportions of Si powder, $Al_2O_3$ powder, C powder, and SiC powder were weighed, mixed fully in a planetary ball mill with ethanol as a dispersant, removed, and dried for later use. Next, a powder B was prepared. 60% of a $B_4C$ powder and 40% of a $B_2O_3$ powder were fully mixed in a ball mill, removed, and dried for later use. 20% of the powder A and 80% of the powder B were weighed, mixed uniformly and used as a first layer of powder for embedding the modified carbon-carbon composite material. 80% of the powder A and 20% of the powder B were weighed, mixed uniformly and used as a second layer of powder for embedding the modified carbon-carbon composite material. The first layer of powder accounted for 30% of the total powder for embedding, and the second layer of powder accounted for 70% of the total powder for embedding. Finally, the crucible was placed in a high-temperature furnace and treated at a temperature of 1600-1800° C. for 0.5-2 hrs under argon protection.

Through the above process, an anti-ablation carbon-carbon composite material modified by a $Zr_{0.8}Ti_{0.2}C_{0.74}B_{0.26}$ ceramic is obtained. The composite material has a linear ablation rate of $-1.8$ $\mu m \cdot s^{-1}$ at 2000° C., $-3.5$ $\mu m \cdot s^{-1}$ at 2500° C., and $-0.33$ $\mu m \cdot s^{-1}$ at 3000° C. in an oxyacetylene flame test, and thus exhibits excellent anti-ablation performance.

Comparison Example 2

A needled felt of carbon fiber having a density of 0.42 $g \cdot cm^{-3}$ was subjected to high temperature treatment to remove the organic adhesive on the fiber surface and release the stress, where the treatment temperature was 2200° C., and the incubation time was 1 hr.

After the heat treatment, the felt body was placed in a chemical vapor deposition furnace, on which pyrolytic carbon was deposited, to prepare a porous carbon-carbon composite material having a density of 1.45 $g/cm^3$, and a porosity of 18%.

A zirconium power having a purity of ≥99.9% was weighed, placed in a graphite can, and compacted. The cut, cleaned and dried carbon-carbon composite material was placed on the compacted zirconium power. The graphite was then positioned in a high-temperature furnace for heat treatment at 1900° C., where the incubation time was 3 hr and the whole process was carried out under argon protection.

The embedding process was the same as above.

Through the above process, an anti-ablation carbon-carbon composite material modified by a ZrC ultrahigh temperature ceramic and a SiC ceramic is obtained. The composite material has a linear ablation rate of 3 $\mu m \cdot s^{-1}$ at 2500° C. in an oxyacetylene flame test.

Comparison Example 3

A needled felt of carbon fiber having a density of 0.42 $g/cm^{-3}$ was subjected to high temperature treatment to remove the organic adhesive on the fiber surface and release the stress, where the treatment temperature was 2200° C., and the incubation time was 1 hr.

After the heat treatment, the felt body was placed in a chemical vapor deposition furnace, on which pyrolytic carbon was deposited, to increase the density of the carbon fiber felt body. In this way, a porous carbon-carbon composite material was prepared. The density-increased porous carbon-carbon composite material has a density of 1.2 g/cm$^3$, and a porosity of 31.2%.

A zirconium power and a titanium powder having a purity of greater than 99.9% were mixed at an atomic ratio of 80:20, and then ball milled on a high-energy planetary ball mill, where the ball-milling speed was 400 rpm, the ball-milling time was 10 hrs, the ball-to-material ratio was 5, and the ball-milling medium was anhydrous alcohol. The ball-milled powder was dried for 8 hrs in a vacuum oven at 80° C., for later use in subsequent steps.

The above-mentioned powder mixture was placed in a graphite can and compacted, and the cut, cleaned and dried carbon-carbon composite material was placed on the compacted powder mixture. The graphite can be then positioned in a high-temperature furnace for heat treatment at 1900° C., where the incubation time was 1 hr and the whole process was carried out under argon protection.

Through the above process, a carbon-carbon composite material modified by a Zr—Ti—C ceramic is obtained. The composite material has a linear ablation rate of 3 μm·s$^{-1}$ at 2000° C. in an oxyacetylene flame test.

The structure and initial density of the carbon fiber felt body, and the heat treatment and embedding processes for the felt body in Comparison Example 2 are exactly the same as those in Example 1, except that the density of the porous carbon-carbon material in Comparison Example 2 is increased and the porosity is decreased, the alloying element is exclusively zirconium, and the incubation time for melt infiltration is extended. The material prepared in Comparison Example 2 is an anti-ablation carbon-carbon composite material modified by a ZrC ultrahigh temperature ceramic and a SiC ceramic. The increased density of the porous carbon-carbon material means the increased volume of the pyrolytic carbon, which, together with the extended incubation time, allows the infiltrated zirconium melt to react sufficiently with the pyrolytic carbon to produce a stoichiometric zirconium carbide. This does harm to the infiltration of the element boron in the following embedding process. Since the element zirconium is used exclusively, the anti-ablation performance of the prepared modified composite material is not as good as that of the carbon-carbon composite material modified by an ultrahigh temperature ceramic prepared in Example 1.

The structure and initial density of the carbon fiber felt body, the heat treatment process for the felt body, the alloying element, the melt infiltration process, and the structure and density of the porous carbon-carbon material in Comparison Example 3 are exactly the same as those in Example 1, except that no embedding process is adopted in Comparison Example 3. The prepared ceramic contains no element boron on one hand, and the prepared modified composite material has no integrated structure on the other hand, resulting in an anti-ablation performance inferior to that of the carbon-carbon composite material modified by an ultrahigh temperature ceramic prepared in Example 1.

Unless otherwise indicated, the numerical ranges involved include the beginning and end values. It will be obvious to those skilled in the art that changes and modifications may be made, and therefore, the aim in the appended claims is to cover all such changes and modifications.

What is claimed is:

1. A method, comprising:
   1) preparing and thermally treating a carbon fiber preform, and depositing pyrolytic carbon on the carbon fiber preform in a chemical vapor infiltration furnace, to yield a porous carbon-carbon composite material;
   2) placing the carbon-carbon composite material deposited with the pyrolytic carbon on a zirconium-titanium powder mixture, and performing a reactive melt infiltration, to yield a carbon-carbon composite material modified by non-stoichiometric zirconium titanium carbide; and
   (3) placing the carbon-carbon composite material modified by non-stoichiometric zirconium titanium carbide in a powder mixture comprising carbon, boron carbide (B$_4$C), silicon carbide (SiC), silicon, and an infiltration enhancer, and performing an embedding method, to form a ceramic-modified carbon-carbon composite material.

2. The method of claim 1, wherein the prepared ceramic-modified carbon-carbon composite material comprises, in percentages by volume, 20-80% of a carbon matrix material, 15-78% of a $Zr_{0.8}Ti_{0.2}C_{0.74}B_{0.26}$ ceramic material, and 2-5% of a silicon carbide ceramic material; and the carbon matrix material is the carbon-carbon composite material deposited with the pyrolytic carbon.

3. The method of claim 1, wherein the carbon fiber preform has a density of 0.1-0.9 g·cm$^{-3}$, and comprises a needled felt or a three-dimensional braided body; in 1), the thermal treatment of the carbon fiber preform comprising placing the carbon fiber preform in a graphite furnace, and incubating at a temperature of between 2000 and 2300° C. for between 1 and 3 hrs.

4. The method of claim 1, wherein in 1), depositing pyrolytic carbon on the carbon fiber preform in a chemical vapor infiltration furnace comprises charging nitrogen, hydrogen, and propylene or methane to the chemical vapor infiltration furnace, and controlling a furnace temperature of between 1000 and 1300° C., a furnace pressure of between 0.3 and 1.3 kPa and a reaction time of between 10 and 60 hrs; and the prepared porous carbon-carbon composite material has a porosity of between 20 and 40%.

5. The method of claim 1, wherein the zirconium-titanium powder mixture is prepared by: sieving a zirconium power having a purity of ≥99.9% using a 325-mesh screen, sieving a titanium powder having a purity of ≥99.9% using a 325-mesh screen, mixing the zirconium power and the titanium powder in a molecular ratio of 0.8:0.2, ball milling the power mixture using a planetary ball mill, and drying a ball-milled mixed powder for 3-8 hrs under vacuum at 80-90° C.; a ball-milling speed is 200-300 rpm, a ball-milling time is 10-25 hrs, a ball-to-powder ratio is 4-10, and a ball-milling medium is alcohol.

6. The method of claim 1, wherein in 2), the reactive melt infiltration is implemented as follows: weighing the zirconium-titanium powder mixture in an amount that is 3-5 times the weight of the porous carbon-carbon composite material, compacting the zirconium-titanium powder mixture in a graphite can, placing the porous carbon-carbon composite material on the zirconium-titanium powder mixture, and placing the graphite can in an infiltration furnace which is heated to a temperature of between 1900 and 2300° C. in a heating rate of 10-20° C./min for between 0.5 and 2 hours in the presence of argon.

7. The method of claim 1, wherein in 3), the infiltration enhancer is alumina (Al$_2$O$_3$), boron oxide (B$_2$O$_3$), silica (SiO$_2$), or a mixture thereof; and the embedding method is implemented at a temperature of between 1600 and 1800° C. for between 0.5 and 2 hrs in the presence of argon.

8. The method of claim 1, wherein the embedding method is implemented as follows:

a) weighing and mixing, on the basis of a total weight of a resulting mixture, 30%-70% by weight (wt. %) of silicon, 5-10 wt. % of alumina ($Al_2O_3$), 10-20 wt. % of carbon, and 10-40 wt. % of silicon carbide (SiC), to yield a mixture; uniformly mixing the mixture with alcohol in a planetary ball mill, and drying, to yield a first powder mixture A;

b) weighing, on the basis of a total weight of a resulting mixture, 30-80 wt. % of boron carbide ($B_4C$) and 20-70 wt. % of boron oxide ($B_2O_3$), and uniformly mixing in a planetary ball mill, and drying, to yield a second powder mixture B;

c) weighing and mixing 20-50 wt. % of the first powder mixture A and 50-80 wt. % of the second powder mixture B, to yield a first power for modifying the carbon-carbon composite material modified by non-stoichiometric zirconium titanium carbide;

d) weighing and mixing 50-80 wt. % of the first powder mixture A and 20-50 wt. % of the second powder mixture B, to yield a second powder for modifying carbon-carbon composite material modified by non-stoichiometric zirconium titanium carbide;

e) weighing the first power and the second powder in a weight ratio of 0.2-1:1, a weight ratio of the carbon-carbon composite material modified by non-stoichiometric zirconium titanium carbide to a mixture of the first power and the second powder being 0.05-0.2:1; and f) respectively embedding the first power and the second powder on the carbon-carbon composite material modified by non-stoichiometric zirconium titanium carbide at a temperature of between 1600 and 1800° C. for between 0.5 and 2 hrs in the presence of argon.

9. A material, comprising, in percentage amounts by volume: 20-80% of a carbon matrix material, 15-78% of a $Zr_{0.8}Ti_{0.2}C_{0.74}B_{0.26}$ ceramic material, and 2-5% of a silicon carbide ceramic material.

* * * * *